United States Patent Office 3,075,950
Patented Jan. 29, 1963

3,075,950
CROSS-LINKED OLEFINIC POLYMERS
Gordon C. Newland, Kingsport, Tenn., and James A. Van Allan, Rochester, N.Y., assignors to Eastman Kodak Company, Rochester, N.Y., a corporation of New Jersey
No Drawing. Filed Aug. 4, 1960, Ser. No. 47,391
12 Claims. (Cl. 260—66)

This invention relates to the preparation of cross-linked olefinic polymers, and more particularly to cross-linked polyethylenes and shaped articles thereof having improved dimensional stability and improved resistance to swelling and dissolution by organic liquids, by treatment of the olefinic polymeric materials with certain aromatic azides.

It is known that the usefulness of polyethylene shaped articles can be greatly extended by cross-linking treatments, for example, by irradiation. Modified polyethylenes so produced show increased tensile strength, reduced solubility, more abrasion resistance—all desirable changes. However, this method also produces some degradation. Various peroxide treatments of polyethylene, as well as treatment with certain basic organic compounds such as amines, have also been proposed by prior art processes for modifying polyethylenes. For one reason or another, none of these processes have proven entirely satisfactory for commercial applications.

We have now found a novel and readily reproducible method for preparing cross-linked polyethylenes, the shaped articles thereof being characterized by greatly improved heat distortion resistance, environmental stress-cracking resistance and resistance to attack and penetration by solvents and swelling agents such as oils and greases as compared with uncross-linked polyethylenes. These properties are particularly useful in wire coatings, tubes, pipes and utensils of all sorts. They are also useful for preparing insolubilized sheets that are useful for wrapping purposes and as photographic film supports. The cross-linking of highly-pigmented polyethylene products by the process of the invention has a remarkable toughening effect, particularly at low temperatures. Tensile strength at elevated temperatures is increased manyfold. Also, the cross-linked products of the invention are entirely devoid of polyethylene degradation products and oxidized components. In addition, they show greatly improved adhesion to glass and other surfaces as compared with that shown by peroxide-cross-linked polyethylenes or uncross-linked polyethylenes.

It is, accordingly, an object of the invention to provide improved cross-linked polyethylene and related hydrocarbon polymers, and shaped articles thereof, which exhibit improved physical properties. Another object is to provide a novel and unique method for preparing such cross-linked hydrocarbon polymer materials. Other objects will become apparent from a reading of the description and examples of the invention.

In accordance with the invention, we prepare cross-linked polyethylenes and related hydrocarbon polymers by incorporating one or more specific aromatic azide compounds therein, followed by heating the resulting composition or shaped article until the desired cross-linking or insolubilization has taken place. The proportions can vary over a relatively wide range, for example as little as 0.1% of the aromatic azides of the invention, based on the total weight of the polymer and the azide compound, are effective in producing substantial cross-linking. In general, the more thorough the insolubilization desired, the higher would be the concentration of the azide compound chosen. Practical upper limits of the azide compound concentration are from 2 to 5%, or even more in some cases, depending on the compatibility of the particular azide compound and the polymer, preferably polyethylene, being used. A concentration of from 0.5 to 2.0% of the azide component is particularly efficacious and is the preferred range. The time and temperature used in the cross-linking heat treatment can also be varied over fairly wide limits, the optimum conditions depending on the particular azide compound selected. Times of 1 minute to 1 hour, and temperatures of from 170° to 220° C. are the preferred ranges of these variables. Some evolution of gas usually accompanies the cross-linking operation by aromatic azides, but this behavior can be minimized by use of lower temperature and longer times of cross-linking treatment. Alternatively, this behavior can be used, if desired, to special advantage in the preparation of cross-linked foamed polyethylenes. The aromatic azide additives can be incorporated into the polyethylenes by any of the known methods of compounding, for example, by mixing the components in powder or granular forms, by spraying the azide onto the polymer powder or granules, by solvent mixing, by melting the components, extrusion mixing, etc., but preferably by milling on hot rolls. Normally, they are highly polymeric solid, thermoplastic materials ranging from waxy products to high density solids having relatively high crystallinity as determined by X-ray diffraction. They are all soluble in hot aromatic hydrocarbon compounds such as tetralin.

The aromatic azide compounds that are particularly suitable in the practice of the invention include 2,2',5,5'-tetramethoxy-4,4'-diazido triphenylmethane, 3,3'-dimethoxy-4,4'-diazidobiphenyl, 4,4'-diazidodibenzylidene acetone, 4-azido-4'-β-hydroxyethoxy chalcone, 2,6-di-p-azidobenzylidene-4-methylcyclohexanone, 4,4'-diazidodiphenyl sulfide [H. Bretschneider et al., Monatsh. 81, pages 970–80 (1950)] and 2,5-bis(4-azidostyryl)-1,3,4-oxadiazole. Of these, the acetone, the chalcone, the methylcyclohexanone, the sulfide and the oxadiazole derivatives are outstanding and are the preferred group.

The following examples serve to illustrate further the preparation of the various intermediate azide compounds and use thereof in the practice of the invention.

*Example 1.—2-Azidobenzoxazole*

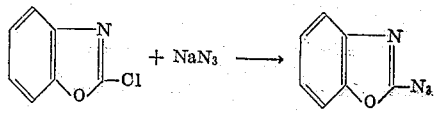

Sodium azide (14 g.) in 20 ml. of water was treated with 30.6 g. of 2-chlorobenzoxazole with good shaking. Then, 50 ml. of methanol was added and the mixture heated on the steam bath for two hours. Water (50 ml.) was added to the reaction mixture, chilled and filtered. Yield, 16.0 g.; M.P. 67° C.

*Analysis.*—Calc. for $C_7H_4N_4O$: C, 52.4; H, 2.5. Found: C, 52.6; H, 2.4.

Example 2.—2,2',5,5'-Tetramethoxy-4,4'-Diazidotriphenylmethane

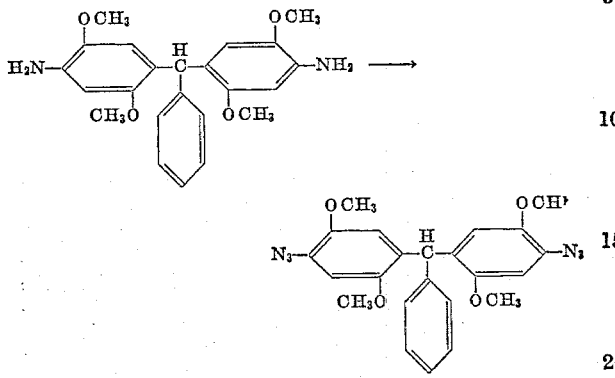

2,2',5,5'-tetramethoxy-4,4'-diaminotriphenylmethane (19.1 g. 0.05 mole) dissolved in 200 ml. of water containing 30 ml. of concentrated hydrochloric acid was cooled to 10° and diazotized with 8.0 g. of sodium nitrite in 40 ml. of water. Then 10 g. of sodium azide in 50 ml. of water was slowly added. The product which separated was collected by filtration, washed with water, and crystallized from acetonitrile with Norite. Yield, 17.0 g.; M.P. 95°.

*Analysis.*—Calc. for $C_{23}H_{22}O_4N_6$: N, 18.9. Found: N, 19.6.

Example 3.—3,3'-Dimethoxy-4,4'-Diazidodiphenyl

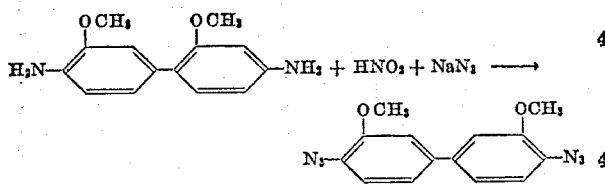

Dianisidine (24.4 g., 0.1 mole) in 150 ml. of water containing 37 ml. of concentrated hydrochloric acid was treated with 15 g. of sodium nitrite in 50 ml. of water at 0.5° with stirring. After one hour, the diazonium solution was filtered from a little insoluble material and a solution of 16 g. of sodium azide in 100 ml. of water was added slowly and with stirring. The diazide, which separated immediately, was filtered off and crystallized twice from alcohol. Yield 16 g.; M.P. 86° C.

*Analysis.*—Calc. for $C_{14}H_{12}O_3N_4$: C, 56.7; H, 4.0. Found: C, 56.8; H, 3.7.

Example 4.—4-Azido-4'-β-Hydroxyethoxychalcone

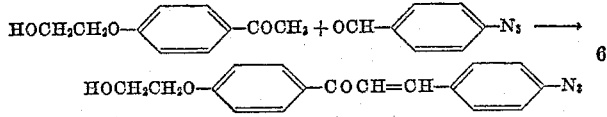

α-(β-Hydroxyethoxy)acetophenone (18.0 g.) and 14.7 ml. of p-azidobenzaldehyde in 100 ml. of methanol was treated with 5 ml. of 25 percent sodium hydroxide. After two hours standing, the product was filtered off and dried. Yield, 23 g.; M.P. 120° C.

*Analysis.*—Calc. for $C_{17}H_{15}O_3N_3$: N, 13.2. Found: N, 13.1.

Example 5.—2,6-Bis(4-Azidobenzylidene)-4-Methylcyclohexanone

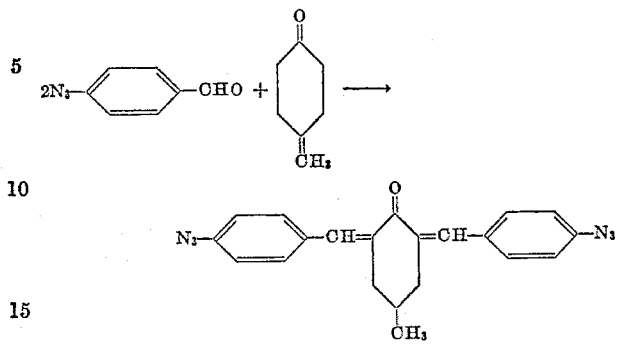

4-azidobenzaldehyde (16.1 ml., 0.1 mole) and 5.50 ml. (0.05 mole) of 4-methylcyclohexanone in 100 ml. of methanol was treated with 5 ml. of 25 percent caustic. After standing overnight, the product which had precipitated was filtered off and dried. Yield, 16 g. Crystallization from ethyl acetate gave 14.5 g. of yellow product, M.P. 121° C.

*Analysis.*—Calc. for $C_{21}H_{18}ON_6$: N, 22.7. Found: N, 21.9.

By substituting for the 4-methylcyclohexanone in the above example with an equivalent amount of acetone, the compound 4,4'-diazidobenzylideneacetone having the structure:

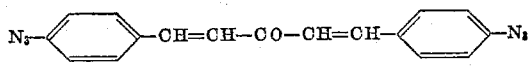

was prepared. It had a melting point of 158–160° C.

Example 6.—2,5-Bis(4-Azidostyryl)-1,3,4-Oxadiazole

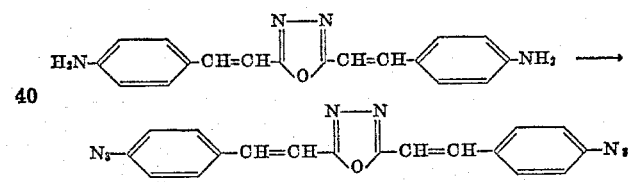

2,5-bis(4-aminostyryl)-1,3,4-oxadiazole (15.2 g., 0.05 mole) was dissolved in 152 ml. of water containing 30 ml. of concentrated hydrochloric acid and diazotized with 8.0 g. of sodium nitrite in 40 ml. of water at 8–10° C. Sodium azide, 10 g. in 50 ml. of water, was added with good stirring. The azide, which separated immediately, was collected by filtration, washed with water, and dried. It was purified by dissolution in acetone and precipitation with water. Yield, 12 g.; M.P. 160° C.

*Analysis.*—Calc. for $C_{18}H_{12}ON_8$: N, 31.5. Found: N, 31.1.

Examples 7–24

These examples illustrate the efficacy of the various aromatic azide compounds of the invention in producing cross-linked polyethylenes. In each case, the polyethylene of density 0.918 and melt index of 2.0 was mixed with the particular aromatic azide additive and hot-roll-compounded for 6 minutes or more. The temperature of the front roll was set at 270° F. and the back roll at 230° F. A sample was then taken of each example composition and compression-molded at 300° F. for 9 minutes to give a plate ⅛ inch thick. Square sections, 1 inch on the side, were cut from these plates and subjected to cross-linking conditions by heating for 1 hour in a mechanical convection oven at 180° C. Samples of the heated squares cut to ⅛ x ⅛ x 1 inch, were tested for solubility by heating 1 hour in tetralin at 145° C. All the compositions of this series of examples were completely soluble in hot tetralin before the cross-linking treatment was applied, i.e., all compositions were processable (rollable or compression-moldable). Accordingly, the degree of resistance to swelling or dissolution by the hot solvent shown by these test strips was taken as a measure of the cross-linking efficiency of the aromatic azide additive which they contained. Cross-linking ratings for the additives were defined as follows:

3 slight swelling
2 moderate swelling
1 much swelling
0 complete solution

However, even at 0 rating some cross-linking is evidenced by increased adhesion to glass. Results for a number of aromatic azides, tested in this way, are recorded in the following table. Comparison is made therein under the same test conditions with several peroxides including dicumyl peroxide used commercially as a cross-linking for polyethylene, and with two aromatic azides which proved ineffective cross-linkers, namely, 2-azidobenzoxazole and 2,3-diazido-1,4-naphthoquinone [K. Fries et al., Ber. 56B, pages 1291–1304 (1923)]. Of these comparison examples, dicumyl peroxide was the only effective cross-linker, but none of them showed any adhesion to glass. It is apparent from this table that several of the aromatic azides at a concentration of only 1% were as effective in cross-linking polyethylene as dicumyl peroxide at a concentration of 3%.

greater adherence to glass surfaces than either peroxide-cross-linked polyethylene (represented by dicumyl peroxide) or uncross-linked polyethylene. The degrees of adhesion observed when the compositions of the table were heated for one hour on glass plates at 180° C. are given in the last column. The following scale of adhesion was used:

2 strong
1 moderate
0 none

On the whole, correlation between insolubilization and improvement in adhesion by the effective cross-linking azide additives was very good. Drinking tumblers injection-molded from the compositions of Examples 22, 23 and 24, and heated to cause cross-linking, did not distort when washed with boiling water. On the other hand, similar untreated (uncross-liked) polyethylene tumblers distorted badly in boiling water.

While the above examples in the table are directed to the polyethylene compositions of the invention, hydrocarbon systems other than polyethylene can also be improved by treatment with the aromatic azides. For example, articles made of polypropylene wax can be made harder and tougher by preliminary heating of the wax with one or more active azides. In this case, however,

TABLE

| Example No. | Cross-Linking Additive | Concentration of Additive, Percent by Weight | Cross-Linking Rating | Free Radical Content of Additive (No. Per Gram ×10$^{-16}$) | Adhesion to Glass Rating |
|---|---|---|---|---|---|
| 7 | None | | 0 | | 0 |
| 8 | Benzoyl peroxide | 0.5 | 0 | | 0 |
| 9 | Di-tert-butyl peroxide | 0.5 | 0 | | 0 |
| 10 | Tert-butyl hydroperoxide | 0.5 | 0 | | 0 |
| 11 | Cumene hydroperoxide | 3.0 | 0 | | 0 |
| 12 | Methylethylketone peroxide | 3.0 | 0 | | 0 |
| 13 | 2,5-Dimethylhexane-2,5-dihydroperoxide | 3.0 | 0 | | 0 |
| 14 | Dicumyl peroxide | 3.0 | 3 | | 0 |
| 15 | α,α'-Diphenyl-β-picryl hydrazyl | 1.0 | 0 | 1.5×10$^5$ | 0 |
| 16 | 2-Azidobenzoxazole | 1.0 | 0 | 0 | 0 |
| 17 | 2,3-Diazido-1,4-naphthoquinone | 1.0 | 0 | 0 | 0 |
| 18 | 2,2',5,5'-Tetramethoxy-4,4'-diazido triphenylmethane | 1.0 | 0 | 1.4 | 1 |
| 19 | 3,3'-Dimethoxy-4,4'-diazidobiphenyl | 1.0 | 0 | 38.0 | 2 |
| 20 | 4,4'-Diazidodibenzylidene acetone | 1.0 | 2 | 2.1 | 1 |
| 21 | 4-Azido-4'-β-hydroxyethoxy chalcone | 1.0 | 2 | | 2 |
| 22 | 2,6-Di-p-azidobenzylidene-4-methylcyclohexanone | 1.0 | 3 | 2.8 | 2 |
| 23 | 4,4'-Diazidodiphenyl Sulfide | 1.0 | 3 | 4.3 | 2 |
| 24 | 2,5-Bis(4-azidostyryl)-1,3,4-oxadiazole | 1.0 | 3 | 0.4 | 2 |

It will be noted from the table that aside from the dicumyl peroxide cross-linking was obtained only with the azides showing measurable free radical contents (electron paramagnetic resonance spectra measurements expressed as the number of free radicals per gram). However, this property cannot be used as the measure of cross-linking for compounds other than the aromatic azides because Example 15 of the table shows the well-known stable free radical, α,α'-diphenyl-β-picryl hydrazyl, to have neither cross-linking activity nor adhesion to glass. The very effective cross-linker, 2,5-bis-(4-azidostyryl)-1,3,4-oxadiazole, which gave a weak free radical signal per se, gave a strong signal after being compounded into the polyethylene. The ineffective cross-linker, 3,3'-dimethoxy-4,4'-diazobiphenyl, which gave a strong free radical signal per se, gave a much lower signal after compounding with the polyethylene. The ineffective cross-linkers, 2,3-diazido-1,4-naphthoquinone and 2-azidobenzoxazole, developed no measurable signals on compounding. In other words, the aromatic azide compound must contain some measurable free radical content, i.e. contain more than 10$^{15}$ free radicals per gram, to be efficacious as a cross-linker for polyethylene. Also, it may be noted that the polyethylene compositions cross-linked by aromatic azides had much no insolubilization of the product was noted. The cross-linking must have remained in the incipient stage. Similar results were obtained with various asphalts to give products having improved hardness, viscosity and surface-cracking resistance.

The invention has been described in detail with particular reference to preferred embodiments thereof, but it will be understood that variations and modifications can be effected within the spirit and scope of the invention as described hereinabove and as defined in the appended claims.

What we claim is:

1. A process for modifying a solid, high molecular weight polyolefin selected from the group consisting of polyethylene and polypropylene which comprises heating a mixture comprising from 98.0 to 99.5% by weight of the said polyolefin and conversely from 2.0 to 0.5% by weight of an aromatic azide containing only carbon, hydrogen, oxygen and nitrogen atoms and wherein each azide group is attached directly to a ring carbon atom having a free radical content greater than 10$^{15}$ per gram, at a temperature of from 170° to 220° C., the amount of said aromatic azide being sufficient to modify said polyolefin.

2. A process for modifying a solid, high molecular weight polyethylene which comprises heating a mixture comprising from 98.0 to 99.5% by weight of said polyethylene and conversely from 2.0 to 0.5% by weight of 4,4'-diazidodibenzylidene acetone, at a temperature of from 170° to 220° C.

3. A process for modifying a solid, high molecular weight polyethylene which comprises heating a mixture comprising from 98.0 to 99.5% by weight of said polyethylene and conversely from 2.0 to 0.5% by weight of 4-azido-4'-β-hydroxyethoxy chalcone, at a temperature of from 170° to 220° C.

4. A process for modifying a solid, high molecular weight polyethylene which comprises heating a mixture comprising from 98.0 to 99.5% by weight of said polyethylene and conversely from 2.0 to 0.5% by weight of 2,6-di-p-azidobenzylidene-4-methylcyclohexanone, at a temperature of from 170° to 220° C.

5. A process for modifying a solid, high molecular weight polyethylene which comprises heating a mixture comprising from 98.0 to 99.5% by weight of said polyethylene and conversely from 2.0 to 0.5% by weight of 4,4'-diazidodiphenyl sulfide, at a temperature of from 170° to 220° C.

6. A process for modifying a solid, high molecular weight polyethylene which comprises heating a mixture comprising from 98.0 to 99.5% by weight of said polyethylene and conversely from 2.0 to 0.5% by weight of 2,5-bis(4-azidostyryl)-1,3,4-oxadiazole, at a temperature of from 170° to 220° C.

7. A modified polyolefin obtained according to the process of claim 1.

8. A modified polyethylene obtained according to the process of claim 2.

9. A modified polyethylene obtained according to the process of claim 3.

10. A modified polyethylene obtained according to the process of claim 4.

11. A modified polyethylene obtained according to the process of claim 5.

12. A modified polyethylene obtained according to the procss of claim 6.

References Cited in the file of this patent

UNITED STATES PATENTS

| | | |
|---|---|---|
| 2,692,826 | Neugebauer et al. | Oct. 26, 1954 |
| 2,764,599 | Clifford et al. | Sept. 25, 1956 |
| 2,830,978 | Muller et al. | Apr. 15, 1958 |
| 2,940,853 | Sagura et al. | June 14, 1960 |